United States Patent
Shimmura et al.

(10) Patent No.: US 7,895,358 B2
(45) Date of Patent: Feb. 22, 2011

(54) REDUNDANCY SWITCHING METHOD

(75) Inventors: Yukihiro Shimmura, Fujisawa (JP); Kazuhiko Haru, Tokyo (JP); Tsutomu Hirao, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 262 days.

(21) Appl. No.: 11/956,947

(22) Filed: Dec. 14, 2007

(65) Prior Publication Data
US 2008/0215714 A1 Sep. 4, 2008

(30) Foreign Application Priority Data
Jan. 15, 2007 (JP) .............................. 2007-005682

(51) Int. Cl.
*G06F 15/177* (2006.01)

(52) U.S. Cl. ...................... 709/238; 709/235; 709/201; 709/217

(58) Field of Classification Search ................. 709/238, 709/235, 201, 217, 222, 225, 230, 245, 250; 714/4; 370/389, 473, 474
See application file for complete search history.

(56) References Cited

U.S. PATENT DOCUMENTS

| | | | | |
|---|---|---|---|---|
| 5,530,703 A | * | 6/1996 | Liu et al. ..................... | 370/255 |
| 6,748,447 B1 | * | 6/2004 | Basani et al. ................ | 709/244 |
| 6,931,102 B2 | * | 8/2005 | Onweller et al. ................ | 379/9 |
| 7,299,294 B1 | * | 11/2007 | Bruck et al. ................. | 709/235 |
| 2003/0005350 A1 | * | 1/2003 | Koning et al. .................. | 714/4 |
| 2004/0109459 A1 | * | 6/2004 | Madour et al. .............. | 370/401 |
| 2006/0153192 A1 | * | 7/2006 | Pohlabel et al. ............. | 370/392 |

FOREIGN PATENT DOCUMENTS

| | | |
|---|---|---|
| JP | 10-320323 | 12/1998 |
| JP | 2004-171370 | 6/2004 |

* cited by examiner

*Primary Examiner*—Wing F Chan
*Assistant Examiner*—Ruolei Zong
(74) *Attorney, Agent, or Firm*—Antonelli, Terry, Stout & Kraus, LLP.

(57) ABSTRACT

A service interruption time is shortened in redundancy switching, thereby to render a vocal service of good quality, in addition to a data service of good quality by a server.

In case of redundancy switching, an IP filter is set in a standby system server, and the standby system server is given the same IP address as an IP address given to an operation system server and is thereafter shifted into an operating state. On the other hand, the original operation system server deletes the given IP address and is thereafter shifted from an operating state into a standby state. The original standby system server releases the set IP filter, and thereafter starts the provision of a service.

11 Claims, 5 Drawing Sheets

REDUNDANCY SWITCHING METHOD

BACKGROUND OF THE INVENTION

The present invention relates to a redundancy switching method.

General-purpose servers have been extensively used for service provisions in IP networks. Especially in a service whose stop is not allowed, an operation is performed by redundantizing a service provision server, in order to ensure a reliability. In such a redundantized configuration, in order that a client who receives the provision of the service may be prevented from becoming aware of the system switching between an operation system server and a standby system server, the change of IP addresses from the operation system server to the standby system server is required in case of the system switching between the general-purpose servers. Heretofore, JP-A-10-320323 (Patent Document 1) has stated a technique wherein an identical IP address can be simultaneously given to the operation system server and the standby system server by making a setting so as not to send back an ARP reply to the ARP handler of the standby system server, and the application of the standby system server can be prepared for the service provision in spite of a standby state, whereby the system switching is permitted in a short time.

Besides, JP-A-2004-171370 (Patent Document 2) has stated an IP floating system wherein two dualized servers are connected with a LAN by an identical floating IP address, and the server to become a standby state (standby system) validates the floating IP address, whereas the server to become a standby state (standby system) invalidates the floating IP address.

SUMMARY OF THE INVENTION

Heretofore, service provisions by general-purpose servers have chiefly been data services, and any inconvenience has been prevented from occurring, by the retransmission of loss data, or the like even with a related-art switching method which incurs a long service interruption time. However, at the present time when extensive vocal services by the general-purpose servers are to be provided, the long service interruption time in a system switching mode forms an obstacle to the service provision of good quality in some cases.

Besides, at present, a service provision is also performed by a protocol which executes the resolution of a layer-2 address on the basis of a standard other than ARP, such as IPv6. With the related art, fast redundancy switching is possible for only a specified layer-2 address resolution protocol such as the standard ARP. Further, with the related art, the alteration of processing needs to be added to a layer-2 address resolution process module which is a function within an operating system.

In view of the above drawbacks, the present invention has for its object to provide a redundancy switching method for an operation system server and a standby system server in a general-purpose server, which method permits fast redundancy switching of short service interruption time without depending upon the specified layer-2 address resolution protocol and without adding any alteration to the layer-2 address resolution process module within the operating system.

According to the solving means of the present invention, there is provided a redundancy switching method in a redundant configuration system including a first server which is given a predetermined address and which is in an operating state for providing a service on the basis of the predetermined address, a second server which is a spare for the first server and which is in a standby state, and a switching hub which connects the first server and the second server and through which the first server or the second server communicates with an external network, comprising the steps of:

allowing the first server to send a system switching notification to the second server in case of redundancy switching at which the first server is to shift from the operating state into a standby state;

allowing the second server which is to shift from the standby state into an operating state, to set a filter so as to cut off communications concerning a layer-2 address resolution, upon receiving the system switching notification from the first server, to give the second server itself the same address as the predetermined address given to the first server which is to shift from the operating state into the standby state, and to shift into the operating state and send an operatization start notification to the first server;

allowing the first server which is to shift from the operating state into the standby state, to delete the given predetermined address, upon receiving the operatization start notification from the second server, to send a notification of the deletion of the predetermined address to the second server, and to shift into the standby state; and allowing the second server to release the set filter, upon receiving the deletion notification from the first server, and to start provision of the service.

According to the present invention, an IP address is replaced by employing a filter, whereby fast redundancy switching of short service interruption time is permitted in the redundancy switching between an operation system server and a standby system server in a general-purpose server, without depending upon any specified layer-2 address resolution protocol and without adding any alteration to a layer-2 address resolution process module within an operating system.

In more detail, according to the invention, advantages as stated below can be attained.

(1) When an operation system server is in an operating state, an IP address can be given to a standby system server, and hence, an application on the standby system server can recognize the given IP address and prepare for the provision of a service during the operating state of the operation system server, so that fast system switching of short service interruption time can be realized.

(2) A filter function is employed for cutting off communications for a layer-2 address resolution, so that the system switching of the invention can be realized without altering the internal processing of an OS.

(3) A filter function is employed for cutting off communications for a layer-2 address resolution, so that the system switching of the invention can be realized, not only in a specified layer-2 address resolution protocol such as the standard ARP used in the standard IPv4, but also in any other layer-2 address resolution protocol.

DESCRIPTION OF THE PREFERRED EMBODIMENTS OF THE INVENTION

Now, embodiments of the present invention will be described.

Figure 1:
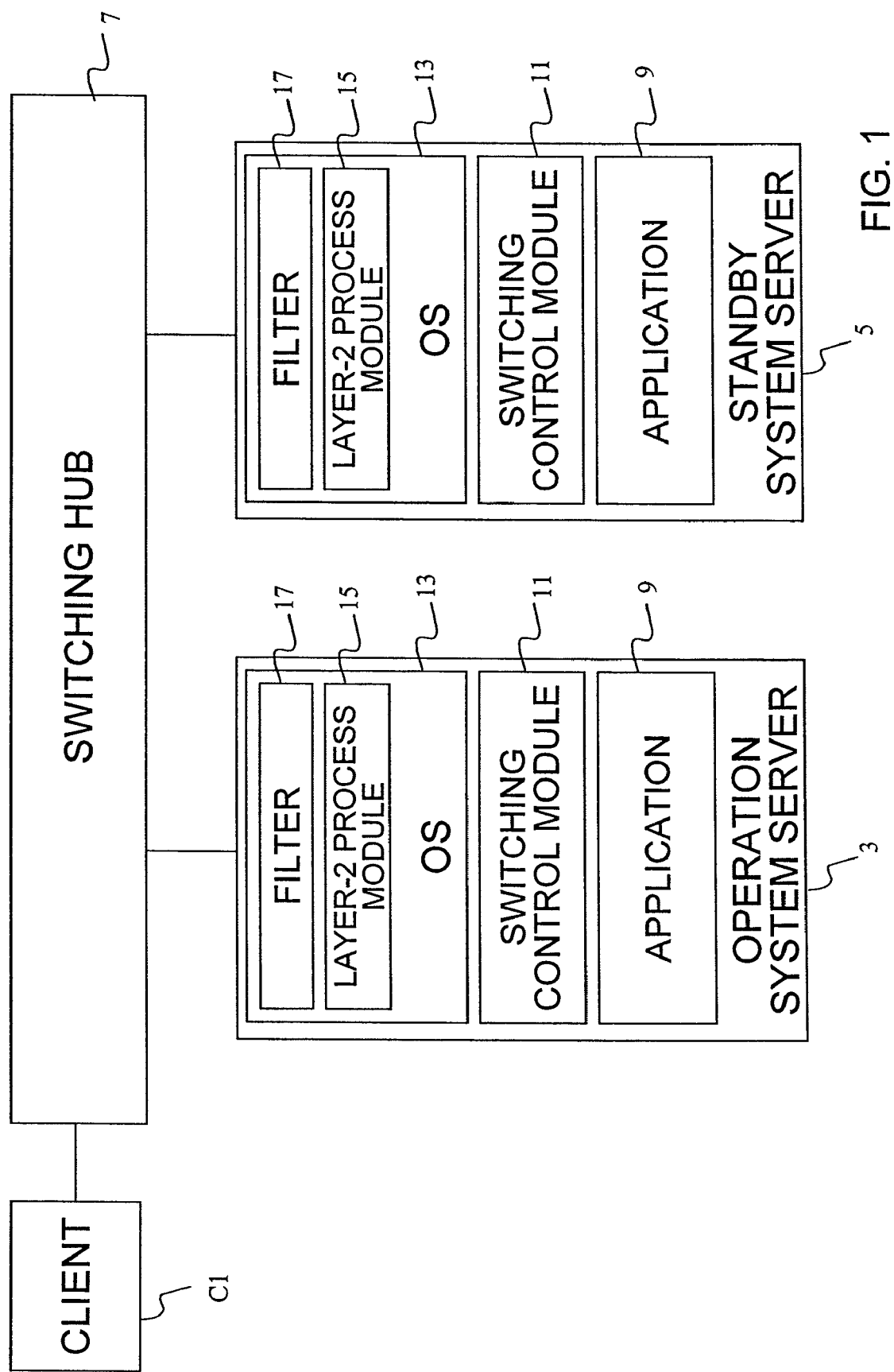
FIG. 1 is an architectural diagram of a system.

FIG. 1 is an architectural diagram of a system.

This system includes a client C1, an operation system server 3, a standby system server 5, and a switching hub 7.

The client C1 receives the provision of a service from the operation system server 3 or the standby system server 5 through the switching hub 7. The operation system server 3 which performs the service provision, and the standby system server 5 which is a spare for the server 3 are connected by the switching hub 7, and the client C1 recognizes the operation system server 3 and the standby system server 5 as service provision servers by one certain IP address. That is, the system is in a state where the client C1 need not alter the IP address of the server of an access destination before and after system switching.

The functional configuration of each of the operation system server 3 and the standby system server 5 includes an operating system (OS) 13 which includes a filter 17 for cutting off communications with the exterior and a layer-2 process module 15 for resolving a layer-2 address, a switching control module 11 which gives a switching instruction and makes a filter setting in the system switching, and an application 9 which provides the service. Besides, by way of example, the standby system server 5 can be brought into the state of hot standby where it stands by in a state in which the OS 13, the switching control module 11 and the application 9 are activated. Incidentally, the standby system server 5 may well be applied in the state of cold standby where it stands by in a state in which the OS 13 and middle ware are activated and in which the application 9 is not activated. The operation system server 3 and the standby system server 5 can communicate a switching instruction notification, etc. to each other through the switching hub 7.

Figure 2:
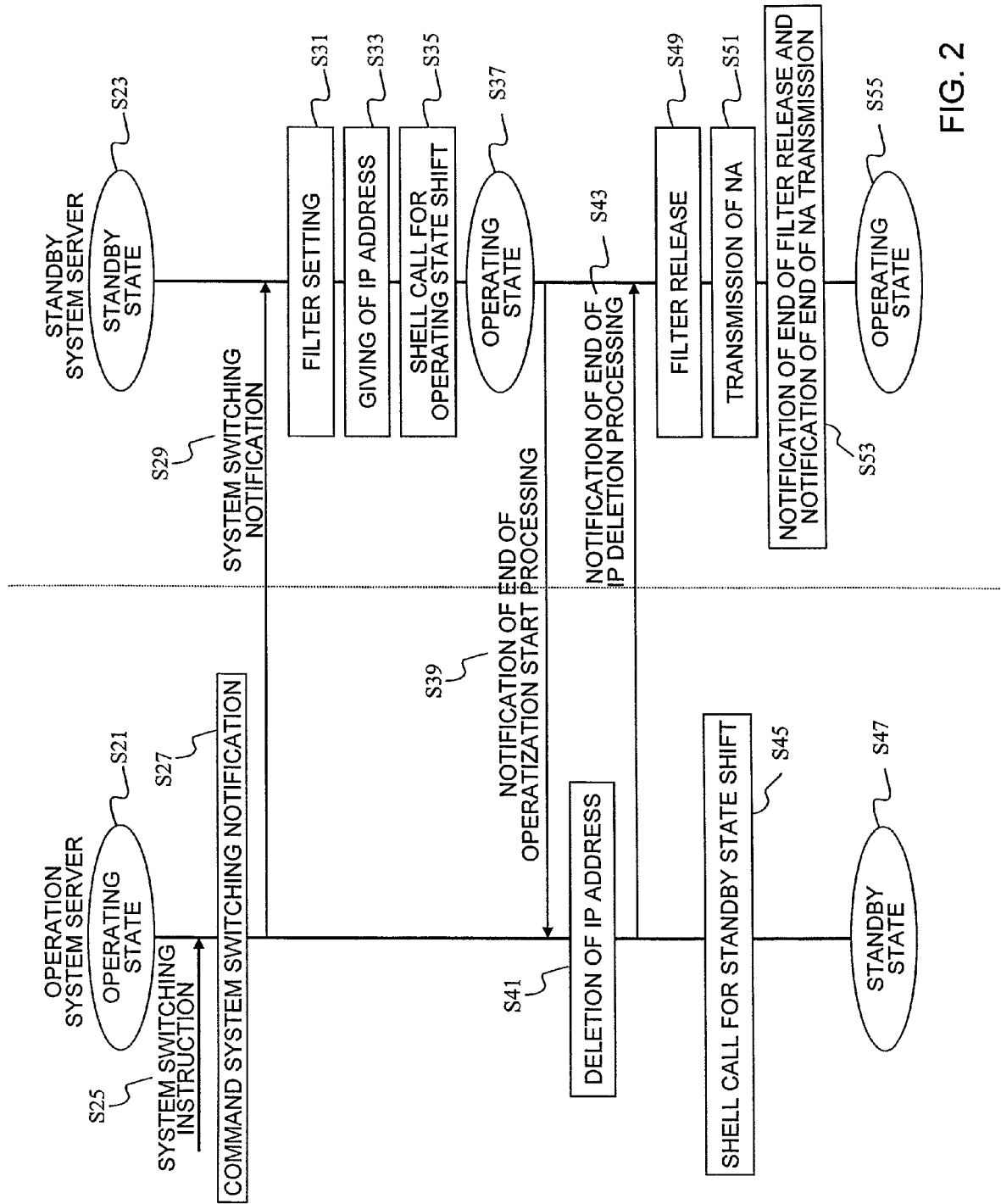
FIG. 2 is a sequence diagram of redundancy switching.

FIG. 2 shows a sequence diagram of the redundancy switching in the system.

Figure 3:
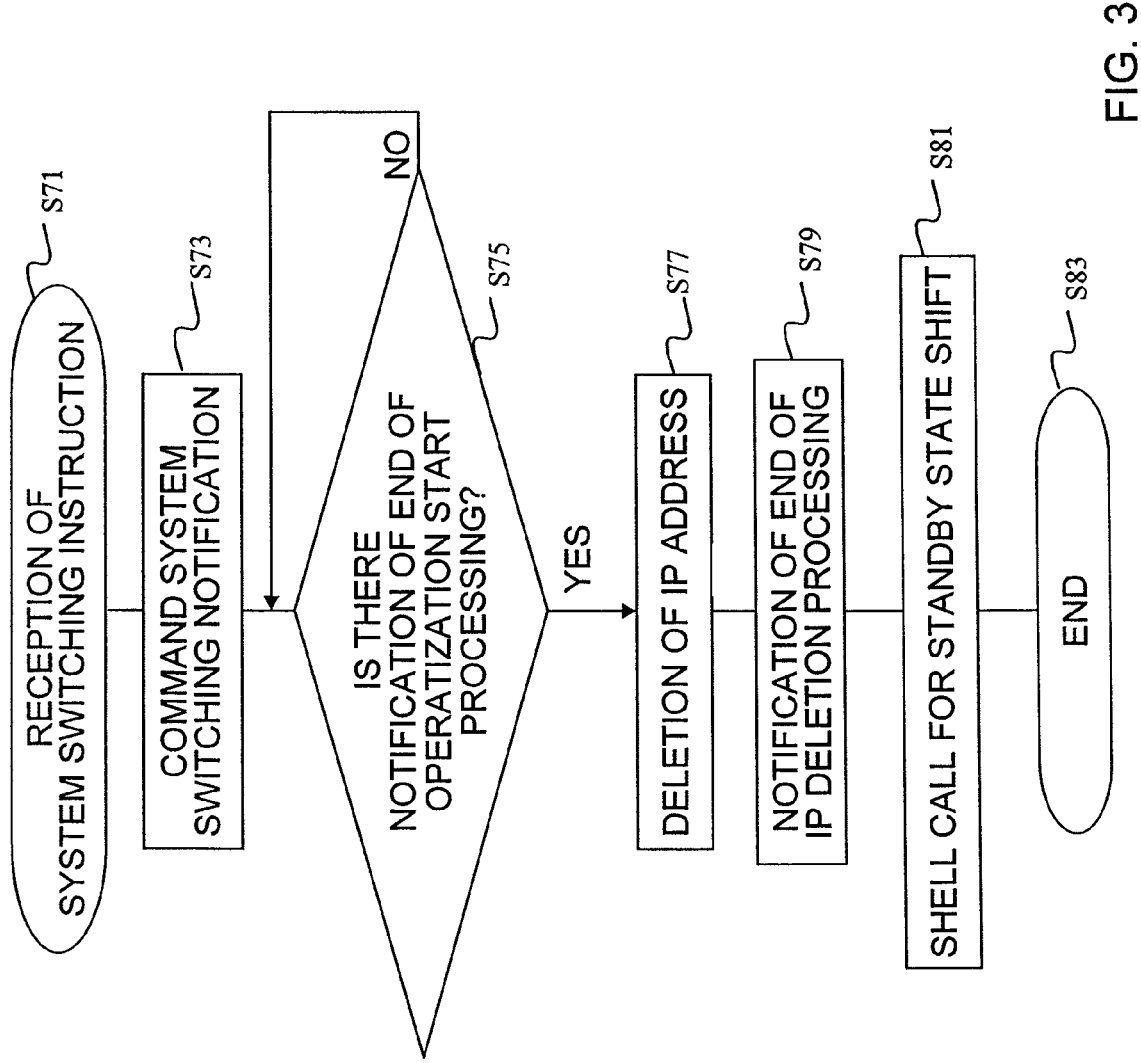
FIG. 3 is a flow chart of the redundancy switching process of an operation system server.
Figure 4:
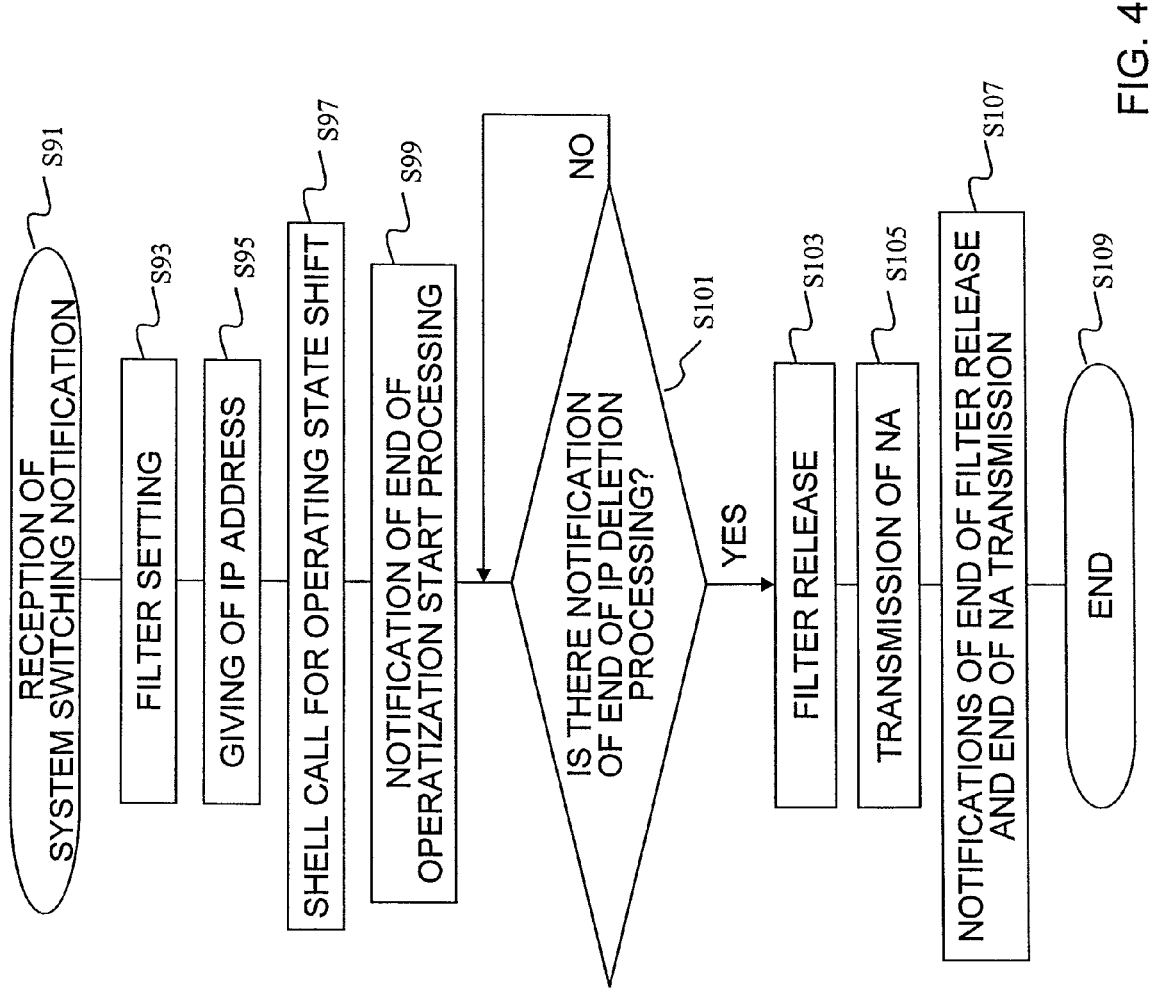
FIG. 4 is a flow chart of the redundancy switching process of a standby system server.

Besides, FIG. 3 shows a flow chart of the redundancy switching process of the operation system server 3, while FIG. 4 shows a flow chart of the redundancy switching process of the standby system server 5.

In the operation system server 3, when the switching control module 11 has sensed the abnormality of the operation system server 3 or has received a system switching instruction S25 from an operator in case of the redundancy switching, it sends a system switching notification S29 to the standby system server 5 by command system switching notification processing (S27 and S73).

In the standby system server 5 having received the system switching notification S29, the switching control module 11 makes the filter setting (S31 or S93) of the filter 17. In the "filter setting" (S31 or S93), a filter function which is the function of the filter 17 of the OS 13 is set, for example, so that the switching control module 11 may cut off communications concerning the execution process of a layer-2 address resolution. The filter function thus set cuts off the sending of information for the layer-2 address resolution, in view of the header part of information sent from the standby system server 5.

Thereafter, the switching control module 11 in the standby system server 5 gives this standby system server 5 the same IP address as an IP address (or a valid IP address) having been given to the operation system server 3 (or the same IP address is validated) (S33 or S95). Incidentally, the processing for giving the same IP address may be, for example, such that the same IP address is held in the appropriate memory of each of the operation system server 3 and the standby system server 5 beforehand, and that this address is used at need. Alternatively, the same IP address to be given to the standby system server 5 (the IP address having been given to the operation system server 3 till then) is notified in the system switching notification S29, whereby the standby system server 5 can be given the same IP address. Since the standby system server 5 given the IP address cannot execute the layer-2 address resolution on account of the filter function already set, any external server other than the standby system server 5 itself cannot recognize that this standby system server 5 holds the IP address. In the standby system server 5, however, the same IP address as that of the operation system server 3 has been given, so that the application 9 can recognize the given IP address and prepare for the service provision to the client C1, etc. On this occasion, the operation system server 3 and the standby system server 5 hold the identical IP address, but the duplication of the IP address is avoided by the filter function of the standby system server 5. At this point of time, therefore, the client C1 remains in the state where the operation system server 3 is recognized as the service provision server.

Thereafter, the switching control module 11 in the standby system server 5 executes operating state shift processing (a shell call or the like) (S35 and S97), and the standby system server 5 shifts from a standby state S23 into an operating system S37. At this point of time, the application 9 recognizes the IP address given at the steps S33 and S95 and prepares for the service provision. Thereafter, the switching control module 11 in the standby system server 5 sends the notification S39 of the end of operatization start processing to the operation system server 3.

Subsequently, the operation system server 3 which has received the notification S39 of the end of the operatization start processing from the standby system server 5 deletes the IP address given to the operation system server 3, by the switching control module 11 in this operation system server 3 (S41 and S77), and it sends the notification S43 of the end of IP deletion processing to the standby system server 5. Thereafter, the operation system server 3 executes standby state shift processing (a shell call or the like) (S45 and S81) by the switching control module 11, and it shifts into a standby state S47.

On the other hand, the standby system server 5 which has received the notification S43 of the end of the IP deletion processing from the operation system server 3 subjects the filter 17 to the release of the filter function by the switching control module 11 (S49 and S103), thereby to restore the communications concerning the layer-2 address resolution with the exterior. Thereafter, the standby system server 5 transmits an NA (Neighbor Advertisement) (S51 and S105) and resolves the layer-2 address for external nodes including the client C1. The transmission of the NA is performed in order to notify the external nodes of the fact that the server given the IP address has been altered. Owing to the notification, the standby system server 5 permits access from an external network as the service provision server. Thereafter, the standby system server 5 executes the notification of the end of the filter release and the notification of the end of the NA transmission (S53 and S107) to the application 9 operating on this standby system server 5, by the switching control module 11. Then, the application 9 recognizes the start of the service provision, and the standby system server 5 is activated as the service provision server (S55).

On this occasion, the operation system server 3 which was first providing the service becomes equivalent to the state of the standby system server 5 which was first in the standby state.

The invention is not restricted to the embodiment illustrated above, but it may well be applied to a redundant configuration system as described below.

Figure 5:
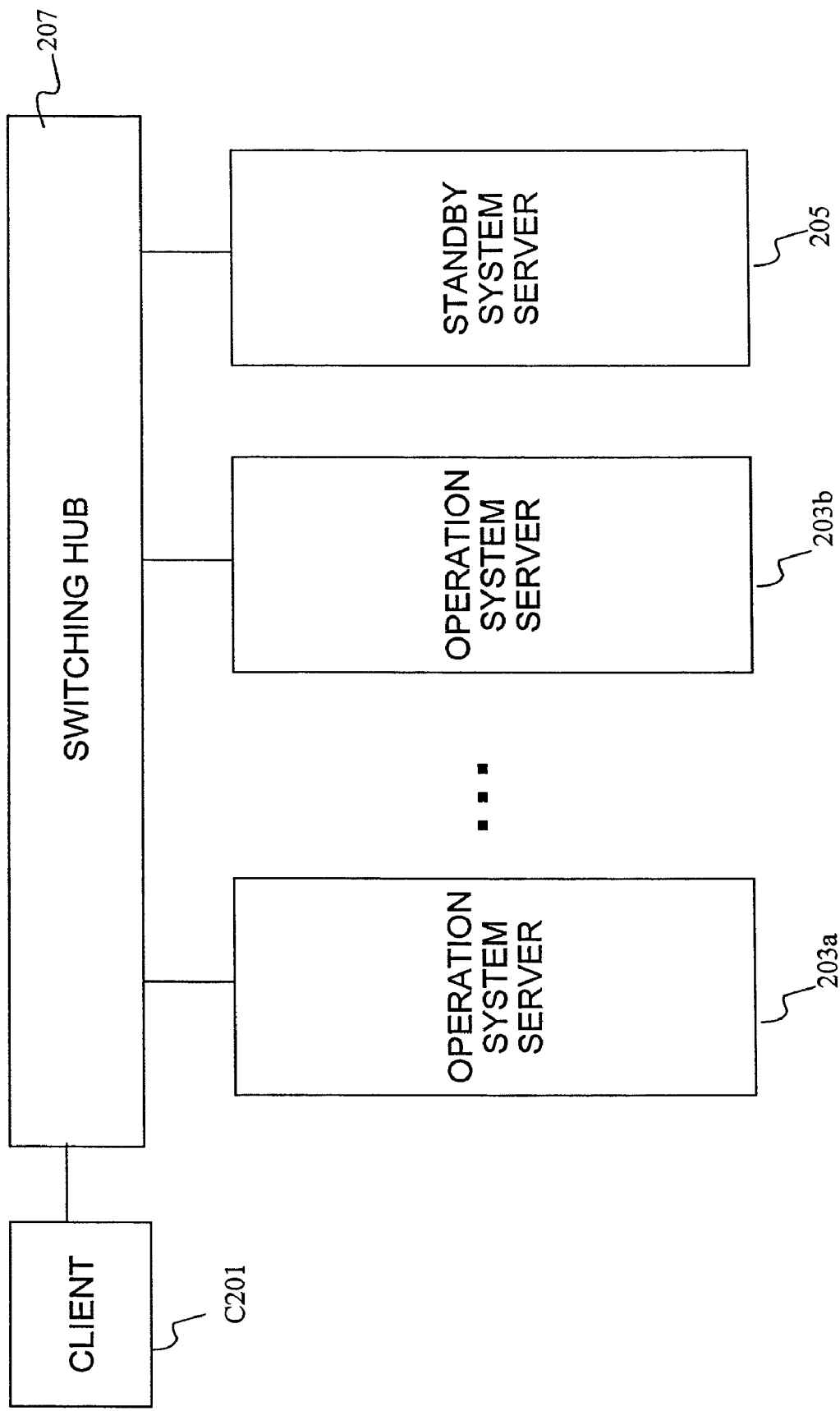
FIG. 5 is an architectural diagram of a system which includes a plurality of operation system servers.

FIG. 5 shows an architectural diagram of the redundant configuration system which is configured of a plurality of operation system servers and a single standby system server.

This system includes a client C201 which receives a service, operation system servers 203a, . . . and 203b, a standby system server 205, and a switching hub 207. The operation system servers 203a, . . . and 203b are servers which provide services with IP addresses being different from one another, while the standby system server 205 is a standby system server which is a spare for any of the operation system servers 203a, . . . and 203b. The concrete configurations of each of the servers 203a, . . . and 203b, the server 205 and the switching hub 207 are the same as the server 3, the server 5 and the switching hub 7 illustrated in FIG. 1 and described in the corresponding parts, respectively. Besides, the concrete operations are the same as those illustrated in FIGS. 2 to 4 and described in the corresponding parts, respectively. In case of redundancy switching, any of the operation system servers 203a, . . . and 203b can be subjected to system switching to the standby system server 205.

By the way, in the case where the same IP address is given at the steps S33 and S95, an IP address to be given to the standby system server 205 (an IP address having been given to the operation system server 203 till then) is notified in the system switching notification S29. Thus, the standby system server 205 can discriminate which of the operation system servers 203a, . . . and 203b has performed the system switching, and it can obtain the same IP address as that of the operation system server having performed the system switching. Besides, the standby system server 205 may well include a table in which IP addresses corresponding to the identification Nos. of the operation system servers 203a, . . . and 203b are stored beforehand. In this case, it is also allowed that each of the operation system servers 203a, . . . and 203b puts the identification No. into the system switching notification S29, and that the standby system server 205 obtains the same IP address by referring to the table on the basis of the received identification No.

The invention is applicable to all sorts of servers such as blade servers and general-purpose servers.

What is claimed is:

1. A redundancy switching method in a redundant configuration system including a first server which is given a predetermined address and which is in an operating state for providing a service on the basis of the predetermined address, a second server which is a spare for the first server and which is in a standby state, and a switching hub which connects the first server and the second server and through which the first server or the second server communicates with an external network, comprising:

the first server sending a system switching notification to the second server in case of redundancy switching at which the first server is to shift from the operating state into a standby state;

the second server which is to shift from the standby state into an operating state, setting a filter so as to cut off sending of information for the layer-2 address resolution by viewing the header part of information sent from the second server, upon receiving the system switching notification from the first server, giving the second server itself the same address as the predetermined address given to the first server which is to shift from the operating state into the standby state but avoids duplication of the predetermined address by the filter of the second server, recognizing the given predetermined address and prepares for providing the service, and shifting into the operating state and sending an operatization start notification to the first server;

the first server which is to shift from the operating state into the standby state, deleting the given predetermined address, upon receiving the operatization start notification from the second server, sending a notification of the deletion of the predetermined address to the second server, and shifting into the standby state; and the second server releasing the set filter, upon receiving the deletion notification from the first server, and starting provision of the service.

2. A redundancy switching method according to claim 1, wherein the redundant configuration system includes a plurality of such first servers which are in operating states, and a single said second server which is in the standby state, and in the case of the redundancy switching, any of the first servers is to shift from the operating state into a standby state, and the second server is to shift from the standby state into the operating state.

3. A redundancy switching method according to claim 1, wherein in the case of starting the provision of the service, the second server transmitting a neighbor advertisement.

4. A redundancy switching method according to claim 1, wherein the first and second servers hold the predetermined address therein, and in the case of the redundancy switching, the second server brings itself into the operating state by giving the predetermined address.

5. A redundancy switching method according to claim 1, wherein:

the first server transmitting the system switching notification containing the predetermined address of the first server itself, to the second server; and the second server adopting the same address as the address of the first server by using the predetermined address contained in the received system switching notification.

6. A redundancy switching method according to claim 1, wherein the second server setting the filter to a filter function of an operating system (OS) in the second server and, the filter function cutting off the sending of information for the layer-2 address resolution by viewing the header part of information sent from the second server.

7. A redundancy switching method according to claim 1, wherein each of the first server and the second server has an operating system (OS) which includes a filter function for cutting off communications with the exterior and a layer-2 process function for resolving a layer-2 address.

8. A redundancy switching method according to claim 1, wherein, after the second server sets the filter, any external server other than the second server cannot recognize that the second server holds an IP address as the predetermined address.

9. A redundancy switching method according to claim 1, wherein, after the second server sets the filter, the first server and the second server hold an identical IP address as the predetermined address, but the duplication of an IP address as the predetermined address is avoided by the filter of the second server.

10. A redundancy switching method according to claim 1, wherein the second server executing a notification of the end of the filter release and a notification of the end of a neighbor advertisement transmission to an application which is operated on the second server, then, the application recognizes the start of the service provision, and the second server is activated as the operating state.

11. A redundancy switching method according to claim 1, wherein, after the second server sets the filter, the first server and the second server hold an identical IP address as the predetermined address, but the duplication of an IP address as the predetermined address is rendered unrecognizable, by the filter of the second server.

* * * * *